US009489406B1

(12) United States Patent
Shapiro (10) Patent No.: US 9,489,406 B1
(45) Date of Patent: Nov. 8, 2016

(54) LINEAR TIME PROCESSING OF WEAK PROPERTIES IN A GARBAGE COLLECTED ENVIRONMENT

(71) Applicant: Google Inc., Mountain View, CA (US)

(72) Inventor: Carl Shapiro, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 408 days.

(21) Appl. No.: 14/067,816

(22) Filed: Oct. 30, 2013

(51) Int. Cl.
*G06F 17/30* (2006.01)

(52) U.S. Cl.
CPC .............................. *G06F 17/30312* (2013.01)

(58) Field of Classification Search
CPC .................................................. G06F 12/0253
USPC .......... 707/206, 813, 816; 711/202, E12.002
See application file for complete search history.

(56) References Cited

U.S. PATENT DOCUMENTS

| 5,560,003 | A  | * | 9/1996  | Nilsen       | G06F 12/0269 |
| 5,687,368 | A  | * | 11/1997 | Nilsen       | G06F 12/0269 |
| 5,819,304 | A  | * | 10/1998 | Nilsen       | G06F 12/0269 711/104 |
| 6,363,403 | B1 | * | 3/2002  | Roy          | G06F 12/0261 |
| 6,671,707 | B1 | * | 12/2003 | Hudson       | G06F 12/0269 |
| 7,519,640 | B1 | * | 4/2009  | Garthwaite   | G06F 12/0261 |
| 2011/0131185 | A1 | * | 6/2011  | Kirshenbaum | G06F 11/1448 707/654 |
| 2012/0079217 | A1 | * | 3/2012  | Copass       | G06F 12/0276 711/156 |

* cited by examiner

*Primary Examiner* — Baoquoc N To
(74) *Attorney, Agent, or Firm* — McDermott Will & Emery LLP

(57) ABSTRACT

A method includes traversing pointers reachable from a root node, identifying an object, determining whether the identified object has a weak property, determining, when the identified object has a weak property, whether the key object referenced by the identified weak property is traversed by the garbage collector, if the key object associated with the identified weak property is traversed by the garbage collector, queuing the value object for later traversal, otherwise, marking the key object as being watched and appending an entry in a table mapping the key objects to a list with value object pointer locations as an entry and determining whether the identified object is visited for the first time by the garbage collector.

23 Claims, 6 Drawing Sheets

LINEAR TIME PROCESSING OF WEAK PROPERTIES IN A GARBAGE COLLECTED ENVIRONMENT

CROSS-REFERENCE TO RELATED APPLICATIONS

The present application claims the benefit of priority under 35 U.S.C. §119 from U.S. Provisional Patent Application Ser. No. 61/800,578, filed on Mar. 15, 2013, the disclosure of which is hereby incorporated by reference in its entirety for all purposes.

BACKGROUND

In computer science, garbage collection is a form of automatic memory management that frees the programmer from manually dealing with memory de-allocation. In other words, garbage collection is a process that performs the automatic recycling of unused computer storage. A garbage collector performs garbage collection by reclaiming garbage, or memory occupied by objects that are unreachable or no longer in use by a computer program. An object refers to any data structure created by a computer program. If an object is referenced by or pointed to by a "strong pointer," it is always protected from garbage collection.

Garbage collected languages also often have a notion of a "weak pointer." In computer programming, a weak pointer is a type of a reference that does not protect the referenced object from collection by a garbage collector. An object that is only pointed to by a weak pointer is subject to garbage collection. If an object is pointed to by both a strong pointer and a weak pointer, the object is protected from garbage collection. Consequently, a weak pointer is a pointer that, unlike a strong pointer, does not protect the object it points to from garbage collection if it is the only pointer to the object. An object referenced only by a weak pointer or a weak reference is considered unreachable and may be collected by the garbage collector.

Weak pointers can be processed in time proportional to the number of weak pointers discovered by the garbage collector during its operation. A garbage collector collects all of the weak pointers and after all of the strong pointers have been visited, processes any remaining weak pointers which refer to unreachable objects in a single pass. In contrast, as previously discussed, a weak property points to two objects and thus, has two pointers, a pointer to a key object and a pointer to a value object. A weak property may be described as a mapping from an object called a "key" to an object called a "value."

A weak property's pointer to a key object behaves like a weak pointer. However, a weak property preserves a reference to the value object only if the key object is also reachable. The pointer to the value object is therefore different from an ordinary weak pointer. A weak property is commonly used to associate information with an object but store it outside of the object. The "key" and "value" objects are permitted to be the same object though this is not commonly the case.

Furthermore, the pointer to the value object is considered weak if the key object is not pointed to by a non-weak pointer. Otherwise, the pointer to the value object may be considered a non-weak pointer or a strong pointer. In other words, a weak property may be defined as an association consisting of two pointers, a pointer to a key object and a pointer to a value object.

A weak property also has a much higher processing time complexity, often quadratic in comparison to the processing time complexity of a weak pointer. Thus, the processing of weak properties is more costly, often quadratic with respect to the number of weak properties traversed during garbage collection. Extensive use of weak properties can increase latency in garbage collection

SUMMARY

The subject disclosure relates generally to memory management in computer applications, and more particularly to processing weak properties.

The subject disclosure relates to a computer-implemented method for linear time processing of weak properties in a computer program written in a garbage-collected programming language that includes traversing, during a tracing routine performed by a garbage collector, pointers reachable from a root node, identifying an object, wherein the object represents a discrete storage location, determining whether the identified object has a weak property, the weak property including a pointer to a key object and a pointer to a value object, determining, when the identified object has a weak property, whether the key object referenced by the identified weak property is traversed by the garbage collector, wherein in a case the key object associated with the identified weak property is traversed by the garbage collector, queuing the value object for later traversal, otherwise, marking the key object as being watched and appending an entry in a table mapping the key objects to a list with value object pointer locations as an entry. The method also includes determining whether the identified object is visited for the first time by the garbage collector, wherein in a case the identified object is visited for the first time, checking whether the identified object is marked as being watched, retrieving a list of pointers watching the identified object, queuing the list of pointers for later traversal, removing a mark for watching the identified object and removing the identified object from the table mapping key objects to the retrieved list of pointers.

The subject disclosure furthermore relates to a machine-readable medium comprising instructions stored therein, which when executed by the processors, cause the processors to perform operations that include generating a queue of locations to be traversed during a tracing routine performed by a tracing garbage collector, traversing the pointers reachable from a root node until all non-weak pointers have been traversed, identifying an object, wherein the object represents a discrete storage location, determining whether the identified object has a weak property, the weak property including a pointer to a key object and a pointer to a value object, determining, when the identified object has a weak property, whether the key object referenced by the identified weak property is traversed by the tracing garbage collector, wherein in a case the key object associated with the identified weak property is traversed by the tracing garbage collector, queuing the value object for later traversal, otherwise, marking the key object as being watched and appending an entry in a table mapping the key objects to a list with value object pointer locations as an entry. The operations also include determining whether the identified object is visited for the first time by the tracing garbage collector, wherein in a case the identified object is visited for the first time: checking whether the identified object is marked as being watched, retrieving a list of pointers watching the identified object, queuing the list of pointers for later traversal, removing a mark for watching the identified object, and removing the identified object from the table mapping key objects to the retrieved list of pointers. The operations furthermore include notifying the computer program of remaining entries in the table.

The subject disclosure also relates to a system that includes a traversing module configured to traverse pointers reachable from a root node, an object identification module configured to identify an object, wherein the object represents a discrete storage location and a weak property identification module configured to identify whether the identified object has a weak property, the weak property including a pointer to a key object and a pointer to a value object. The system also includes a reference module configured to determine, when the identified object has a weak property, whether the key object referenced by the identified weak property is traversed by the garbage collector, a queuing module configured to queue the value object for later traversal in a case the key object associated with the identified weak property is traversed by the garbage collector, a watch module configured to mark the key object as being watched and append an entry in a table mapping the key objects to a list with value object pointer locations as an entry in a case the key object associated with the identified weak property is not traversed by the garbage collector and a tracking module configured to determine whether the key object is visited for the first time by the garbage collector.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended clauses. However, for purpose of explanation, several implementations of the subject technology are set forth in the following figures.

DETAILED DESCRIPTION

In the following detailed description, numerous specific details are set forth to provide a full understanding of the present disclosure. It will be apparent, however, that the implementations of the present disclosure may be practiced without some of these specific details. In other instances, structures and techniques have not been shown in detail so as not to obscure the disclosure.

Methods and systems for processing weak properties in a computer program written in a garbage collected language are provided herein. Garbage collection is a process that performs the automatic recycling of unused computer storage. An example of garbage collector performing such a process may be, for example a tracing garbage collector. Tracing garbage collectors determine what storage is used by computing whether an object is directly or indirectly referenced from a set of roots. Roots are known pointers containing locations in a computer program that are known to point to objects used by the program. Typically these locations are the program's stack, registers, and global variables.

A tracing garbage collector begins the process of garbage collection by following the pointers in the root to the objects they point to. An object is deemed to have been visited by a garbage collector when the garbage collector follows a pointer to the object. A pointer is deemed to have been traversed when a garbage collector follows the pointer from one object to another. Such objects typically contain pointers to other objects. The garbage collector follows such pointers, but only if the pointers point to objects that have not yet been visited by the garbage collector. This process repeats until the garbage collector cannot find objects that have not yet been visited.

In other words, a tracing garbage collector is said to compute partitioning of objects into live objects and objects to be collected by the garbage collector (garbage objects). Most garbage collectors are known as tracing garbage collectors, meaning that, given a set of "roots," the garbage collector recursively traces from such roots to identify all reachable, and therefore, live objects.

A tracing garbage collector performs the partitioning of objects into live objects and garbage objects by traversing all nodes reachable from a set of root nodes. An object refers to any data structure created by the program. The process of creating an object requires some amount of computer storage to be used. Objects that are traversed are considered live. Objects that are not traversed are considered garbage. An object that is pointed to by a strong pointer is by default protected from garbage collection. However, an object that is pointed to by a weak pointer is not protected from garbage collection if the weak pointer is the only pointer to the object. Thus, when an object is only pointed to by a weak pointer, the object is subject to garbage collection. If an object is pointed to by both a strong pointer and a weak pointer, the object is protected from garbage collection.

Weak properties are treated specially by garbage collectors. If a garbage collector determines that a key object is reachable only from the weak property, the garbage collector notifies the computer program. Weak properties may be stored on the heap as part of an object or stored outside the heap as pointers treated by convention as a weak property. A garbage collector might know where the values are and that they are logically root nodes as opposed to being discovered from a traversal from a root node. A weak property may have one or more value object pointers.

In garbage collection, tracing may follow a depth-first or a breadth-first order, However, as long as the traversal of an object is eventually followed by the traversal of all of the objects pointed to by the already traversed objects, the order of the traversal is unimportant. A tracing garbage collector automatically determines which objects are unreachable. Objects that are unreachable can have their storage automatically recycled. However, the effect of such determination cannot be directly observed by a computer program because the computer program can observe only those objects reachable from the root objects. That is why it is sometimes useful for a computer program to be notified by the garbage collector when objects are reachable in a restricted way, thereby allowing a process to monitor an object and know if it has been collected without interfering with the collection of the object. Situations where such notifications are useful include recycling external resources that cannot be directly recycled by the garbage collector. File descriptors and sockets are resources that may be representative entities, as intervention from the operating system is required to recycle their storage. In such situations, a computer program registers its interest in an object containing a file descriptor or socket with the garbage collector. The garbage collector then notifies the computer program when the containing object is nearly garbage. Such notification then causes an action such as closing the file descriptor or shutting down and closing the network socket. Weak pointers assist in recognizing when an object is nearly garbage by providing such signal.

The disclosed technology is a linear time algorithm for processing weak properties in a garbage collected environment. Some of the features and benefits of the subject technology include the algorithm not requiring a different tracing routine for different parts of the algorithm and performing minimal work during the phase of processing weak properties. According to aspects of the disclosed technology, the processing of a weak property is delayed only as long as the key object remains unvisited by the tracing garbage collector. Once the tracing garbage collector discovers that the key object is referenced through non-weak pointers, it can immediately add the value objects as roots.

The linear time algorithm causes a system to recursively traverse all objects reachable from a root object until all non-weak pointers have been traversed. If a weak property is encountered, the system determines whether a key object associated with the weak property has been traversed. When the key object has been traversed, the system queues the value object associated with the weak property for later traversal. Otherwise, the system marks the key object as being watched and appends an entry in a table mapping the key object to a list of pointer locations. If such a table does not already exist, the system creates the table. Indicating whether a key object is being watched may be implemented by including a bit that indicates that a key object is being watched in the object's header word. This may be the same place where a bit indicating the object has been visited resides. The header word is loaded and modified by the garbage collector regardless, so the addition of the bit would not impair speed or efficiency.

The system also determines whether an object is visited for the first time. When the key object is visited for the first time, the system checks if the key object is marked as being watched. When the key object is being watched, the system retrieves the list of pointer locations watching the key object and queues them for later traversal. The system also removes the mark for watching from the key object and removes the key object from the table.

The system then proceeds to visit all entries in the table, notify the computer program, and recycle the storage of all un-traversed objects (i.e., those objects that have not been traversed). Notifications are implemented by scheduling the invocation of a function provided by the computer program after the garbage collection with weak pointer or the location of the weak pointer. Depending on implementation, the weak pointer may be "broken" and replaced with a nil or null pointer, thereby allowing the objects pointed to by the weak pointer to immediately be reclaimed. Such implementation may be carried out by replacing each pointer in the properties in the table with the null pointer after the trace is complete. Alternatively, the objects pointed to by the weak pointers may be treated as roots and the computer program may be responsible for breaking the pointers so the objects can by recycled on a subsequent garbage collection. Such alternative implementation may be carried out by queuing all of the pointers in the property table for traversal and resuming the garbage collection.

According to an aspect of the disclosed technology, the unreachable objects may be preserved so that some further action can be performed on them. In such variation, the system may iterate through the unreachable pointer locations, unset the watched bit on the objects they point to, and trace through the objects that had the watch bit unset. All of the subsequently discovered weak properties must also be traced through but the algorithm remains linear time and no special tracing routine are required for processing weak properties.

The advantages of the disclosed technology include the integration of weak property processing into the tracing routine, thus only needing a single tracing routine that behaves as is a linear time algorithm, thus increasing speed, efficiency and simplicity of processing weak properties in a garbage collected environment. According to an aspect of the disclosed technology, the processes disclosed herein are performed by a tracing garbage collector.

FIGS. 1A-1J illustrate a series of diagrams of an example process 100 for linear time processing of objects that have weak properties in a computer program written in a garbage-collected programming language. The series of diagrams depicts a root R 101, a weak property P 102, a value object V 103, a key object K 104, an object O 105 and a table 106. The diagram represent the objects and pointers in a system that is being garbage collected. Each object is represented by a numbered circle. Each pointer is represented by an arrow between two numbered circles. Live objects are those objects reachable from a root node through some set of edges in the diagram. Garbage objects are those objects that are unreachable from the root node.

Figure 1A:
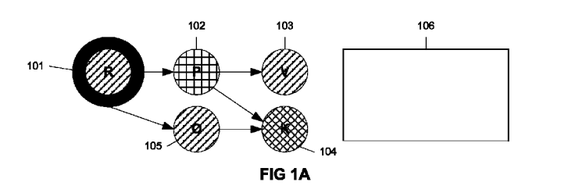
FIGS. 1A-1J are diagrams of an example process for linear time processing of objects that have weak properties.

In FIG. 1A, the tracing garbage collector starts at root R 101 and visits P 102, which for the purposes of illustration is represented as a weak property. At this point, key object K 104 is un-traversed so K is marked as watched and value object V 103 remains un-traversed. An entry from K to P is added to the table 106.

Figure 1B:
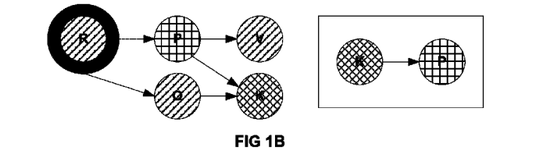

In FIG. 1B, the tracing garbage collector visits key object K 104 after following the edge from root R 101 to object O 105. Seeing that key object K 104 is marked as watched by the tracing garbage collector, the garbage collector looks up key object K 104 in the table 106, finds weak property P 102, and queues its referents key object K 104 and value object V 103 for traversal, and remove the entry for key object K 104 from the table 106.

Figure 1C:
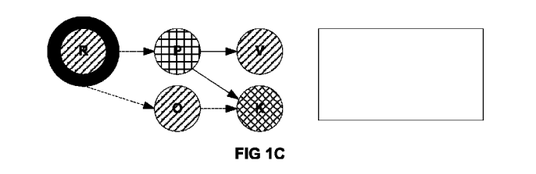
Figure 1D:
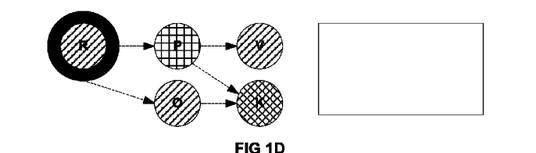

In FIG. 1C, the tracing garbage collector traverses the un-traversed referents of weak property P, value object V 103 and key object K 104. FIG. 1D shows the completed traversal.

Figure 1E:
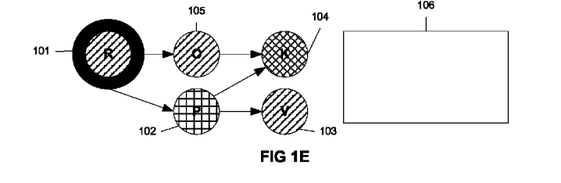
Figure 1F:
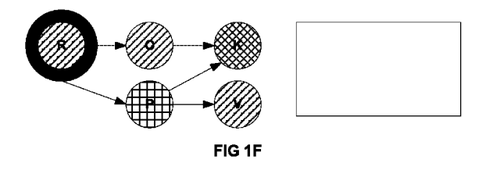
Figure 1G:
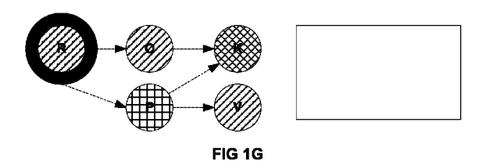

FIG. 1E shows an alternative graph where the tracing garbage collector reverses the order in which object O 105 and weak property P 102 are visited. The tracing garbage collector starts at the root R 101 and traverses object O 105 and then traverses key object K 104. Because the pointer from O 105 to K 104 is a non-weak pointer, its traversal is not delayed. FIG. 1F shows the next visit from the tracing garbage collector; the visit to weak property P. Because key object K 104 has already been traversed, value object V 103 is immediately traversed by the tracing garbage collector. FIG. 1G shows a completed traversal.

Figure 1H:
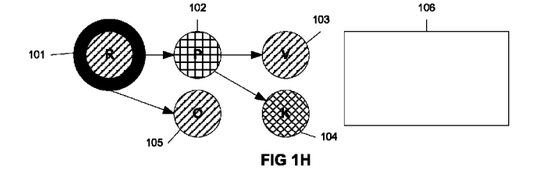
Figure 1I:
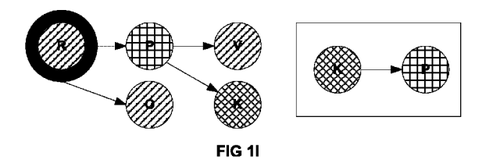
Figure 1J:
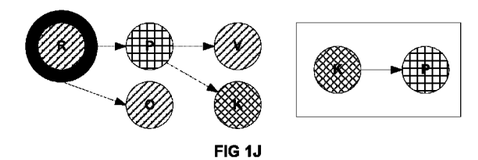

FIG. 1H shows an alternative graph where the edge (connector) from object O 105 to key object K 104 is not present. As before, the tracing garbage collector starts at root R 101 and visits weak property P 102. At this point, key object K 104 is unvisited so K 104 is marked as watched by the tracing garbage collector. Value object V 103 remains unvisited. An entry from K to P is added to the table 106. In FIG. 1I, the tracing garbage collector visits object O 105 and complete the traversal. FIG. 1J shows that there are still entries in the table 106. In such event, the computer program is notified by the tracing garbage collector. The right-hand side of every entry in the side table is notified as well, in this case the weak property P 102. The location of the pointer (the weak property) is the content of the notification.

Notifications are implemented by scheduling the invocation of a function provided by the computer program after the garbage collection with either the weak property or the object containing the weak property. Depending on implementation, a system may "break" the weak pointer and replace the weak pointer with a nil or null pointer, thereby allowing the objects pointed to by the weak pointer to immediately be reclaimed. Accordingly, each pointer in the properties in the table may be replaced with the null pointer after the trace is complete.

Alternatively, notifications may be implemented whereby the objects pointed to by the weak property's pointers are treated as roots and the computer program handles the breaking of pointers so the objects can be recycled on a subsequent garbage collection. Accordingly, the system may queue all of the pointers in the table for traversal and resume the garbage collection.

Figure 2:
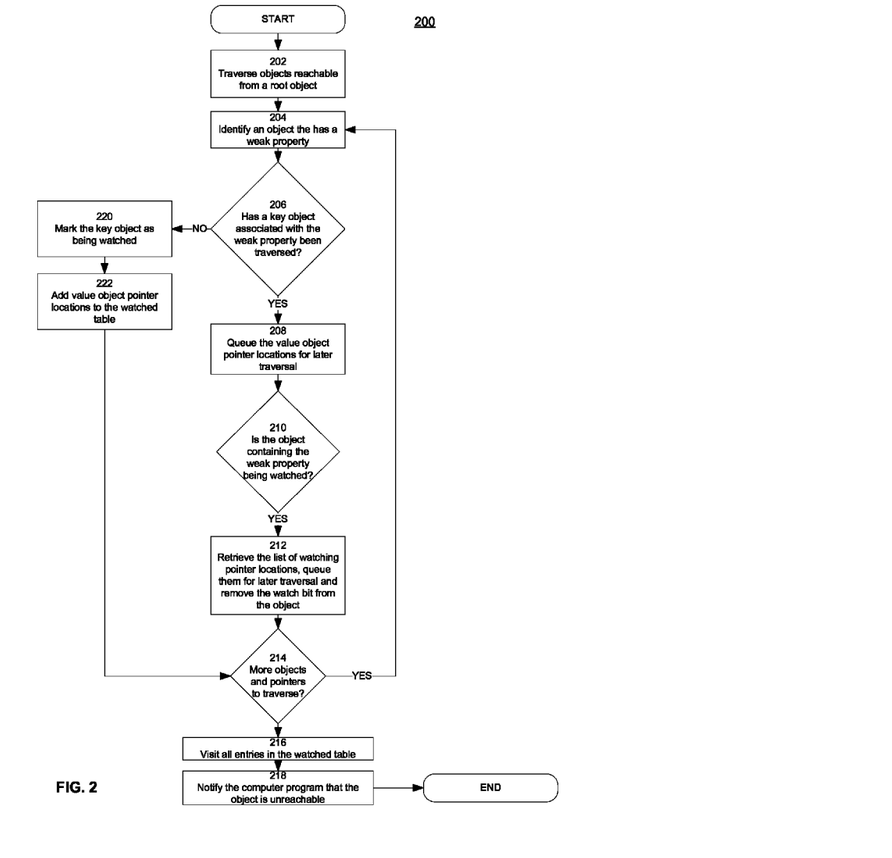
FIG. 2 illustrates a flow diagram of an example process for linear time processing of objects that have weak properties.

FIG. 2 is a flowchart of an example process 200 for linear time processing of objects that have weak properties in a computer program written in a garbage-collected programming language. According to an aspect of the disclosed technology, the processes discussed herein are performed by a tracing garbage collector. The process starts and at block 202, the system traverses objects reachable from a root object. The traversal is performed by a tracing garbage collector during a tracing routine. At block 204, the system identifies an object that has a weak property. To that end, the system also identifies the location of the weak property. The location of a weak property may be known to the garbage collector ahead of time. For example, a garbage collector might keep tables of weak properties outside the heap where objects are allocated. The location of a weak property may be inside an object. Either as a distinguished weak property object type or as part of a larger object. Certain information available at garbage collection time may indicate to the garbage collector that a particular object is or contains a weak property. The weak property includes a pointer to a key object and one or more pointers to a value object. Key and value objects are objects that are pointed to by a weak object.

At decision block 206, the system determines whether the key object associated with the identified weak property has been traversed by the tracing garbage collector. In a case it is determined that the object associated with the identified weak property has been traversed, the system proceeds to block 208 and queues the value object pointer locations for later traversal. At decision block 210, the system determines whether the object containing the weak property is being watched by the tracing garbage collector. In a case it is determined that the weak property is being watched, the system retrieves the list of watching pointer locations, queues the pointer locations for later traversal and removes a bit indicating that an object is being watched, or the watch bit, from the object. At decision block 214, the system determines whether there are more objects and pointers to traverse. If there are more objects and pointers to traverse, the system returns to block 204. Otherwise, the system visits all entries in a table containing objects that are being watched, or the "watched" table at block 216. At block 218, the system notifies the computer program that the object is unreachable and the process ends.

Returning to decision block 206, when it is determined that the object associated with the weak property has not been traversed, the system marks the key object as being watched at block 220 and adds the value object pointer locations to the watched table at block 222. Upon adding the value object pointer locations to the watched table, the system proceeds to decision block 214 to determine whether there are more objects and pointers to traverse.

Figure 3:
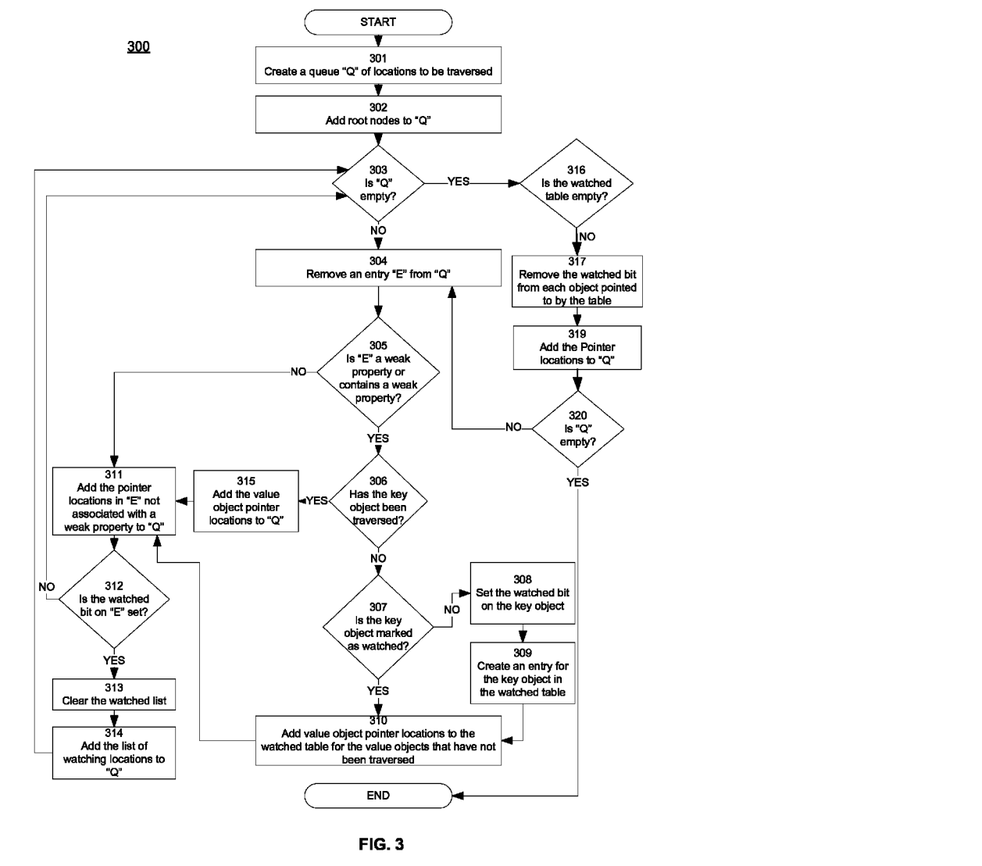
FIG. 3 illustrates a flow diagram of an example process for linear time processing of objects that have weak properties.

FIG. 3 is a flow diagram of an example process 300 for linear time processing of objects that have weak properties in a computer program written in a garbage-collected programming language. At block 301, the system generates a queue of locations to be traversed. Such queue may be called "Q." At block 302, the system checks whether there are root nodes that may be added to "Q," and adds root nodes to "Q" such that "Q" consists of root locations. At decision block 303 the system checks whether "Q" has entries or is empty. When the system determines that Q is not empty, the process continues to block 304 and removes an entry from "Q." Such entry may be called "E." The system checks whether "E" is a weak property or contains a weak property at decision block 305. When the determination is at least one of, that "E" is a weak property or that "E" contains a weak property, the system further checks whether the key object has been traversed at decision block 306. If the key object has not been traversed, the system further checks whether the key object is marked as watched at decision block 307. In a case the key object is not marked as being watched, the system sets the watched bit on the key object at block 308, creates an entry for the key object in the table containing other key objects that are being watched, or in other words, at the "watched" table, at block 309 and adds the value object pointer locations to the watched table for the value objects that have not been traversed, at block 310.

Alternatively, in a case the key object is marked as being watched, and the associated value objects have not been traversed, the system proceeds directly to block 310 to add the value object pointer locations to the watched table for the value objects that have not been traversed. Upon the value object pointer locations for the value objects that have not been traversed having been added to the watched table, the system adds pointer locations in "E" not associated with the weak property to "Q" at block 311. Returning to decision block 306, where the system determines whether the key object has been traversed, if it is determined that the key object has been traversed, the system adds the value object pointer locations to "Q" at block 315 prior to completing the steps described at block 311. At decision block 312, the system checks whether a bit indicating that a key object is being watched, or the "watched" bit, is set on "E." When the watched bit on "E" is set, the system clears the watched bit at block 313 and adds the list of watching locations to "Q" at block 314. The system then returns to decision block 303, to check whether "Q" is empty or whether there are other entries in "Q." Similarly, when the watched bit on "E" is not set, the system returns to decision block 303 to check whether "Q" is empty or whether there are other entries in "Q."

In addition to the discussion of decision block 303 above, when the determination is that "Q" is empty, the system proceeds to decision block 316 and determines whether the watched table is empty. When the watched table is not empty, the system removes the watched bit from each object pointed to by the table at block 317 and notifies the pointer location at block 318. The system may add the pointer locations to "Q" at block 319 prior to checking again whether "Q" is empty at decision block 320. When it is determined that "Q" is not empty, the system returns to block 304. Otherwise, when it is determined that "Q" is empty, the process 300 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing display. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
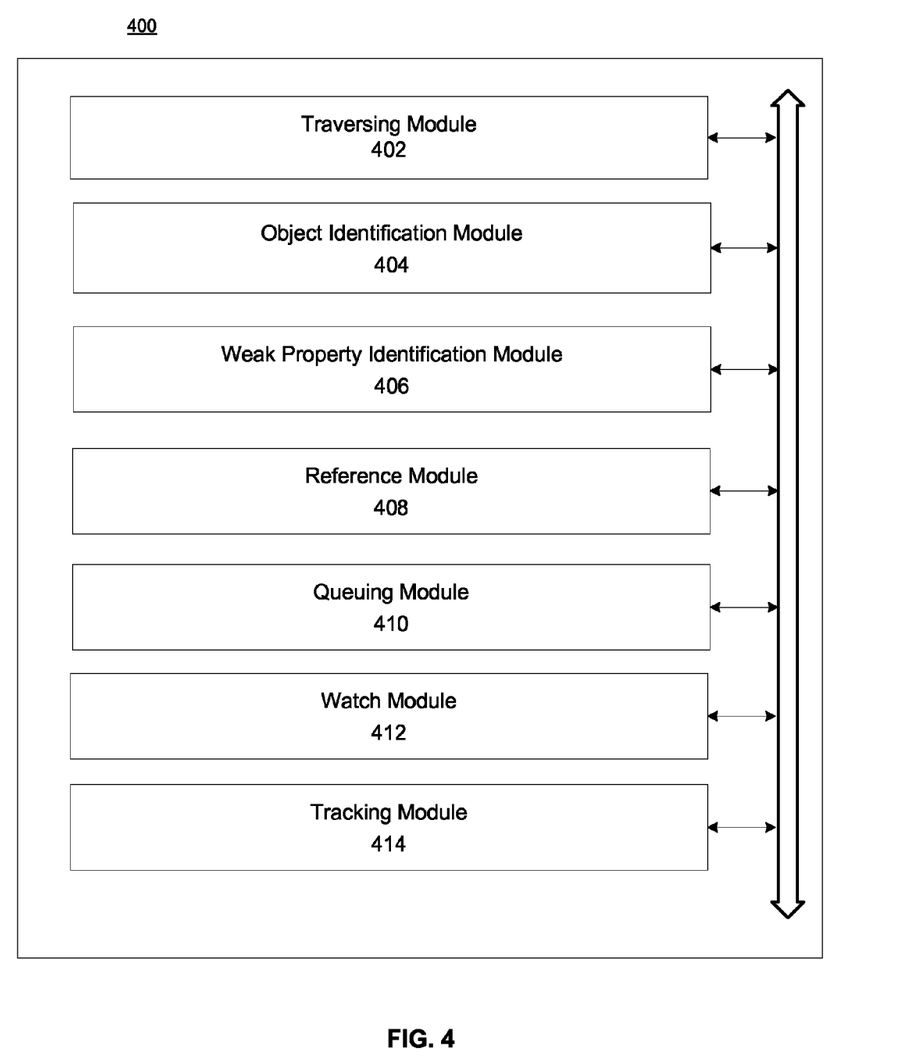
FIG. 4 conceptually illustrates an example of a system for processing of objects that have weak properties.

FIG. 4 illustrates an example of system 400 for processing of objects that have weak properties, in accordance with various aspects of the subject technology. System 400 comprises a traversing module 402, an object identification module 404, a weak property identification module 406, a reference module 408, a queuing module 410, a watch module 412, and a tracking module 414.

The traversing module 402 is configured to traverse pointers reachable from a root node. The object identification module 404 is configured to identify an object, wherein the object represents a discrete storage location. The weak property identification module 406 is configured to identify whether the identified object has a weak property, the weak property including a pointer to a key object and a pointer to a value object. The reference module 408 is configured to determine, when the identified object has a weak property, whether the key object referenced by the identified weak property is traversed by the garbage collector. The queuing module 410 is configured to queue the value object for later traversal in a case the key object associated with the identified weak property is traversed by the garbage collector. The watch module 412 is configured to mark the key object as being watched and append an entry in a table mapping the key objects to a list with value object pointer locations as an entry in a case the key object associated with the identified weak property is not traversed by the garbage collector, and the tracking module 414 is configured to determine whether the key object is visited for the first time by the garbage collector.

The traversing module 402 may further be configured to traverse pointers reachable from the root node during a tracing routine performed by a garbage collector. The traversing module 402 may additional be configured to traverse pointers reachable from a root node until all non-weak pointers have been traversed.

In a case the key object is visited for the first time, the tracking module 414 may further be configured to check whether the key object is marked as being watched, retrieve a list of pointers watching the key object, check whether the key object is marked as being watched, retrieve a list of pointers watching the key object, remove a mark for watching the key object from the key object and remove the key object from the table mapping the key objects. In the case the key object is visited for the first time, the tracking module 414 may furthermore be configured to queue the pointers for later traversal. According to an aspect of the disclosed technology, the garbage collector referred to by system of FIG. 4 is a tracing garbage collector.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 5:
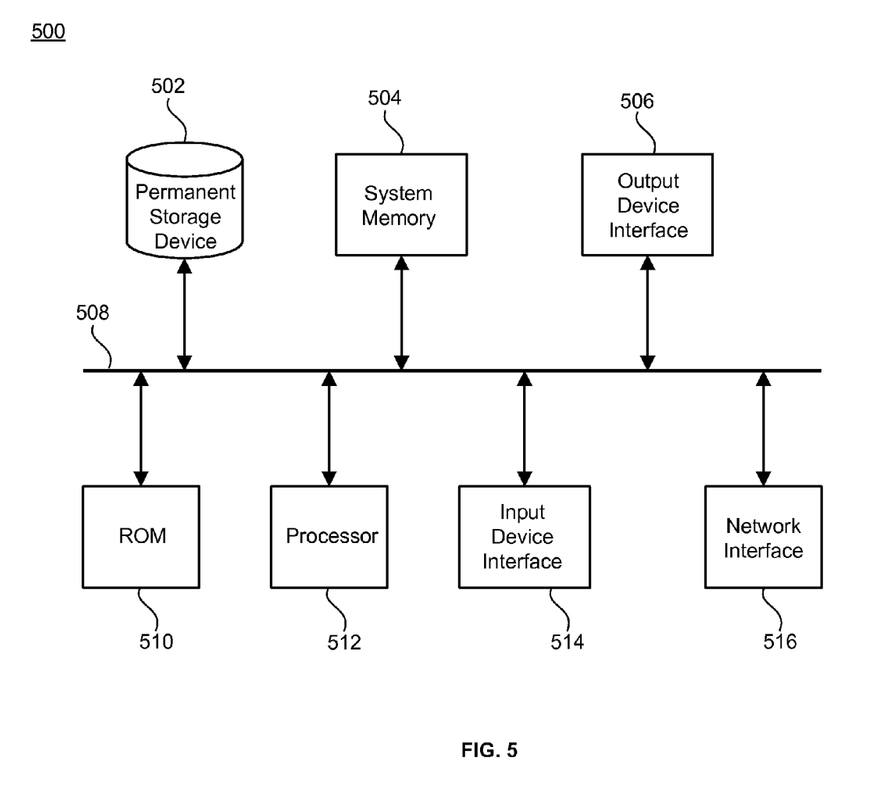
FIG. 5 conceptually illustrates an example electronic system with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any clauses of this application, the terms "computer," "server," "processor," and "memory" all refer to electronic or other technological devices. These terms exclude people or groups of people. For the purposes of the specification, the terms display or displaying means displaying on an electronic device. As used in this specification and any clauses of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the clauses are not intended to be limited to the aspects shown herein, but are to be accorded the full scope consistent with the language clauses, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the clauses.

The previous description is provided to enable any person skilled in the art to practice the various aspects described herein. Various modifications to these aspects will be readily apparent to those skilled in the art, and the generic principles defined herein may be applied to other aspects. Thus, the clauses are not intended to be limited to the aspects shown herein, but are to be accorded the full scope consistent with the language clauses, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for linear time processing of weak properties in a computer program written in a garbage-collected programming language, the method comprising:
    traversing, during a tracing routine performed by a garbage collector, pointers reachable from a root node;
    identifying an object, wherein the object represents a discrete storage location;
    determining whether the identified object has a weak property, the weak property including a pointer to a key object and a pointer to a value object;
    determining, when the identified object has a weak property, whether the key object referenced by the identified weak property is traversed by the garbage collector, wherein in a case the key object referenced by the identified weak property is traversed by the garbage collector, queuing the value object for later traversal, otherwise, marking the key object as being watched and appending an entry in a table mapping the key objects to a list with value object pointer locations; and
    determining whether the identified object is visited for the first time by the garbage collector, wherein in a case the identified object is visited for the first time:
        checking whether the identified object is marked as being watched;
        retrieving a list of pointers watching the identified object;
        queuing the list of pointers for later traversal;
        removing a mark for watching the identified object; and
        removing the identified object from the table mapping key objects to the retrieved list of pointers.

2. The computer-implemented method of claim 1, further comprising:
    visiting all entries in the table mapping the key objects to a list of pointer locations.

3. The computer-implemented method of claim 1, further comprising:
    recycling memory storage associated with un-traversed objects.

4. The computer-implemented method of claim 1, further comprising:
    traversing the pointers reachable from a root node until all non-weak pointers have been traversed; and
    notifying the computer program of remaining entries in the table.

5. The computer-implemented method of claim 1, further comprising:
generating a queue of locations to be traversed.

6. The computer-implemented method of claim 1, wherein the garbage collector is a tracing garbage collector.

7. The computer-implemented method of claim 1, further comprising:
removing a bit indicating that the object is watched from each object pointed to by the table.

8. The computer-implemented method of claim 1, further comprising:
adding pointer locations for value objects to a list of location to be traversed.

9. A non-transitory machine-readable medium comprising instructions stored therein, which when executed by the processors, cause the processors to perform operations comprising:
generating a queue of locations to be traversed during a tracing routine performed by a tracing garbage collector;
traversing the pointers reachable from a root node until all non-weak pointers have been traversed;
identifying an object, wherein the object represents a discrete storage location;
determining whether the identified object has a weak property, the weak property including a pointer to a key object and a pointer to a value object;
determining, when the identified object has a weak property, whether the key object referenced by the identified weak property is traversed by the tracing garbage collector, wherein in a case the key object associated with the identified weak property is traversed by the tracing garbage collector, queuing the value object for later traversal, otherwise, marking the key object as being watched and appending an entry in a table mapping the key objects to a list with value object pointer locations as an entry;
determining whether the identified object is visited for the first time by the tracing garbage collector, wherein in a case the identified object is visited for the first time:
checking whether the identified object is marked as being watched;
retrieving a list of pointers watching the identified object;
queuing the list of pointers for later traversal;
removing a mark for watching the identified object; and
removing the identified object from the table mapping key objects to the retrieved list of pointers; and
notifying the computer program of remaining entries in the table.

10. The non-transitory machine-readable medium of claim 9, the operations further comprising:
visiting all entries in the table mapping the key objects to a list of pointer locations.

11. The non-transitory machine-readable medium of claim 9, the operations further comprising:
recycling memory storage associated with un-traversed objects.

12. The non-transitory machine-readable medium of claim 9, the operations further comprising:
removing a bit indicating that the object is watched from each object pointed to by the table.

13. The non-transitory machine-readable medium of claim 9, the operations further comprising:
adding pointer locations for value objects to a list of location to be traversed.

14. A system for linear time processing of weak properties in a computer program written in a garbage-collected programming language, the system comprising:
a memory; and
at least one processor coupled to the memory and configured to:
traverse pointers reachable from a root node;
identify an object, wherein the object represents a discrete storage location;
identify whether the identified object has a weak property, the weak property including a pointer to a key object and a pointer to a value object;
determine, when the identified object has a weak property, whether the key object referenced by the identified weak property is traversed by the garbage collector;
queue the value object for later traversal in a case the key object associated with the identified weak property is traversed by the garbage collector;
mark the key object as being watched and append an entry in a table mapping the key objects to a list with value object pointer locations as an entry in a case the key object associated with the identified weak property is not traversed by the garbage collector; and
determine whether the key object is visited for the first time by the garbage collector.

15. The system of claim 14, wherein the traversing further comprises to traverse pointers reachable from the root node during a tracing routine performed by a garbage collector.

16. The system of claim 14, wherein the traversing further comprises to traverse pointers reachable from a root node until all non-weak pointers have been traversed.

17. The system of claim 14, wherein the garbage collector is a tracing garbage collector.

18. The system of claim 14, wherein, in a case the key object is visited for the first time, the system is further configured to:
check whether the key object is marked as being watched; and
retrieve a list of pointers watching the key object.

19. The system of claim 14, wherein, in a case the key object is visited for the first time, the system is further configured to:
check whether the key object is marked as being watched;
retrieve a list of pointers watching the key object;
remove a mark for watching the key object from the key object; and
remove the key object from the table mapping the key objects.

20. The system of claim 14, wherein, in a case the key object is visited for the first time, the system is further configured to queue the pointers for later traversal.

21. A computer-implemented method comprising:
identifying an object that has a weak property by analyzing pointers reachable from a root node, wherein the object represents a discrete storage location and the weak property includes a pointer to a key object, the key object associated with the weak property and a pointer to a value object, the value object associated with the weak property;
determining whether the key object associated with the weak property has been traversed by a garbage collector, wherein in a case the key object has been traversed by the garbage collector, causing the value object associated with the weak property to be traversed later, otherwise, marking the key object associated with the weak property as being watched and appending an entry in a table mapping key objects to a list with value object pointer locations;

determining whether the identified object is visited for the first time by the garbage collector, wherein in a case the identified object is visited for the first time:

checking whether the identified object is marked as being watched; and retrieving a list of pointers watching the identified object; and visiting all entries in the table mapping the key objects to a list of pointer locations.

22. The computer-implemented method of claim 21, wherein determining that the identified object is visited for the first time by the garbage collector further comprises:

removing a mark for watching the identified object; and removing the identified object from the table mapping key objects to the retrieved list with value object pointer locations.

23. The computer-implemented method of claim 21, wherein determining that the identified object is visited for the first time by the garbage collector further comprises:

queuing the list with value object pointer locations for later traversal.

\* \* \* \* \*